(12) United States Patent
Sarkar et al.

(10) Patent No.: US 8,167,712 B2
(45) Date of Patent: May 1, 2012

(54) METHOD AND APPARATUS FOR PLAYER REPLACEMENT IN AN ON-LINE GAME

(75) Inventors: Bhaswar Bhanu Sarkar, Foster City, CA (US); Ben Choorut, Foster City, CA (US)

(73) Assignee: Sony Computer Entertainment America Inc., Foster City, CA (US)

(*) Notice: Subject to any disclaimer, the term of this patent is extended or adjusted under 35 U.S.C. 154(b) by 929 days.

(21) Appl. No.: 11/835,644

(22) Filed: Aug. 8, 2007

(65) Prior Publication Data

US 2009/0042646 A1    Feb. 12, 2009

(51) Int. Cl.
*A63F 9/24* (2006.01)
*A63F 13/00* (2006.01)
*A63F 13/12* (2006.01)
*G06F 17/00* (2006.01)

(52) U.S. Cl. ........... 463/29; 463/25; 463/42; 273/108.1; 273/317.1; 273/461; 709/203; 709/218; 709/219; 709/227; 715/706; 715/741; 715/744; 715/758; 902/10; 902/23

(58) Field of Classification Search ............ 463/1, 9–13, 463/16, 20, 25, 29, 40–43; 273/108.1, 145 R, 273/147, 141 A, 317.1, 351, 454–456, 460–461; 704/E15.047; 709/203–207, 216–219, 225, 709/227, FOR. 106, FOR. 111, FOR. 112, 709/FOR. 115, FOR. 122, FOR. 130, FOR. 131, 709/FOR. 132, FOR. 141, FOR. 148, FOR. 149, 709/FOR. 153; 715/200, 700, 706, 738, 715/744, 757–758, 762–764, 741; 902/10, 902/23; *A63F 9/24, 13/00, 13/12; G06F 17/00*
See application file for complete search history.

(56) References Cited

U.S. PATENT DOCUMENTS

| | | | | |
|---|---|---|---|---|
| 5,964,660 A * | 10/1999 | James et al. | ...................... | 463/1 |
| 6,450,887 B1 * | 9/2002 | Mir et al. | .......................... | 463/42 |
| 6,692,359 B1 * | 2/2004 | Williams et al. | ................ | 463/42 |
| 6,699,125 B2 * | 3/2004 | Kirmse et al. | .................. | 463/42 |
| 6,932,708 B2 * | 8/2005 | Yamashita et al. | .............. | 463/42 |
| 7,043,530 B2 * | 5/2006 | Isaacs et al. | .................. | 709/206 |
| 7,240,093 B1 * | 7/2007 | Danieli et al. | ................ | 709/205 |
| 7,278,920 B1 * | 10/2007 | Klamer et al. | .................. | 463/34 |
| 7,288,028 B2 * | 10/2007 | Rodriquez et al. | .............. | 463/42 |
| 7,311,608 B1 * | 12/2007 | Danieli et al. | .................. | 463/42 |

(Continued)

OTHER PUBLICATIONS

International Search Report and Written Opinion issued in International Patent Application No. PCT/US2008/071967 on Nov. 3, 2008.

*Primary Examiner* — Arthur O. Hall
(74) *Attorney, Agent, or Firm* — Procopio, Cory, Hargreaves & Savitch LLP

(57) ABSTRACT

Methods, apparatuses, and techniques for replacing players in an online game are described. Replacing players in an online game includes associating a first player with a first online identity and associating a second player with a second online identity. Then replacing the first player and associating the first online identity with a third player that is registered with the first online identity. Replacing players in an online game can also include associating a first player with a first online identity and associating a second player with a second online identity. Then replacing the first player and the second play so that the second player is associated with the first online identity and the first player is associated with the second online identity.

9 Claims, 14 Drawing Sheets

U.S. PATENT DOCUMENTS

| | | | |
|---|---|---|---|
| 7,458,894 B2 * | 12/2008 | Danieli et al. | 463/42 |
| 7,525,930 B2 * | 4/2009 | Fridman et al. | 370/259 |
| 7,685,241 B2 * | 3/2010 | Crawford et al. | 709/206 |
| 7,686,690 B2 * | 3/2010 | Miura et al. | 463/29 |
| 7,699,706 B2 * | 4/2010 | Walker et al. | 463/42 |
| 7,766,748 B2 * | 8/2010 | Williams et al. | 463/42 |
| 7,819,749 B1 * | 10/2010 | Fish et al. | 463/42 |
| 7,828,661 B1 * | 11/2010 | Fish et al. | 463/42 |
| 7,857,701 B2 * | 12/2010 | Murphy et al. | 463/42 |
| 7,899,862 B2 * | 3/2011 | Appelman et al. | 709/204 |
| 7,946,910 B2 * | 5/2011 | Feeney et al. | 463/9 |
| 8,025,572 B2 * | 9/2011 | Spanton et al. | 463/42 |
| 8,052,528 B2 * | 11/2011 | Shiraiwa | 463/42 |
| 2002/0142834 A1 * | 10/2002 | Sobue | 463/30 |
| 2004/0127289 A1 * | 7/2004 | Davis et al. | 463/42 |
| 2004/0128319 A1 * | 7/2004 | Davis et al. | 707/104.1 |
| 2004/0148347 A1 * | 7/2004 | Appelman et al. | 709/204 |
| 2004/0152517 A1 * | 8/2004 | Hardisty et al. | 463/42 |
| 2005/0071481 A1 * | 3/2005 | Danieli | 709/229 |
| 2005/0202875 A1 * | 9/2005 | Murphy et al. | 463/42 |
| 2005/0227766 A1 * | 10/2005 | Kaminagayoshi | 463/42 |
| 2006/0121987 A1 * | 6/2006 | Bortnik et al. | 463/42 |
| 2006/0271959 A1 * | 11/2006 | Jacoby et al. | 725/46 |
| 2007/0123353 A1 * | 5/2007 | Smith | 463/42 |
| 2007/0191111 A1 * | 8/2007 | Sylla et al. | 463/43 |
| 2007/0218997 A1 * | 9/2007 | Cho | 463/42 |
| 2008/0234043 A1 * | 9/2008 | McCaskey et al. | 463/29 |

* cited by examiner

METHOD AND APPARATUS FOR PLAYER REPLACEMENT IN AN ON-LINE GAME

BACKGROUND

1. Field of the Invention

The present invention relates to on-line gaming, and more specifically, to player replacement in an on-line game.

2. Background

In typical on-line game applications players may interact and communicate with partners and other on-line game players and virtual worlds during the online experience. The effectiveness of the experience can be important to the player, who may have many choices of online games and other activities.

A person playing an online game has an identity in the game. This identity can be referred to as an "online identity", "character", or "persona." As players join or leave a game there can be a disruption in the game play experienced by the other players in the game. For example, if one player decides to leave the game, that player's online identity will no longer participate in the game and the other players will not be able to interact with the online identity. This loss of interaction can have a negative impact on the enjoyment of the gaming experience of other players. Likewise, if a player knows that they only have a limited amount of time available to play an online game, that player may be hesitant to join the game knowing that they will leave a short time later and disrupt the other players.

Thus, there is a need for improving online gaming as players enter and leave the online game.

SUMMARY

Embodiments of the present invention provide methods, systems, apparatus, and programs for replacing players in an online game. In one embodiment, replacing players in an online game includes associating a first player with a first online identity and associating a second player with a second online identity. Then replacing the first player and associating the first online identity with a third player.

In an embodiment, replacing the first player is initiated in accordance with game rules. Also, the third player can be provided information about a current game situation before they replace the other player. Information about the game situation can include, for example, an audio/video clip of recent game play, or messages sent by the first player to the second player.

In another embodiment, replacing players in an online game includes associating a first player with a first online identity and associating a second player with a second online identity. Then replacing the first and second players such that the first player is now associated with the second online identity and the second player is now associated with the first online identity.

In one embodiment, replacing players can be initiated in accordance with predetermined rules of the game. In another embodiment, replacing players can be initiated by a player indicating a desire to be replaced, or a player indicating that they want to join the game, or other criteria.

In one embodiment, replacement of players in the online game can be controlled by a network enabled device. The device can include a network interface that receives replacement requests from players of an online game. The device can also include a memory that includes a map that associates players with online identities of the game. A processor can update the map to change players associated with the online identity in response to replacement requests.

In an embodiment, the processor also verifies that a player is registered with an online identity before associating the player with the identity. In one embodiment, the network enabled device can be a server. In another embodiment, the network enabled device can be a peer in a peer-to-peer network.

Other features and advantages of the present invention will become more readily apparent to those of ordinary skill in the art after reviewing the following detailed description and accompanying drawings.

DETAILED DESCRIPTION

After reading the following description it would become apparent to one skilled in the art how to implement the invention in various alternative embodiments and alternative applications. However, although various embodiments of the present invention will be described herein, it is to be understood that these embodiments are presented by way of example only, and not limitations. As such, this detailed description of various embodiments should not be construed to limit the scope or breadth of the present invention.

Figure 1:
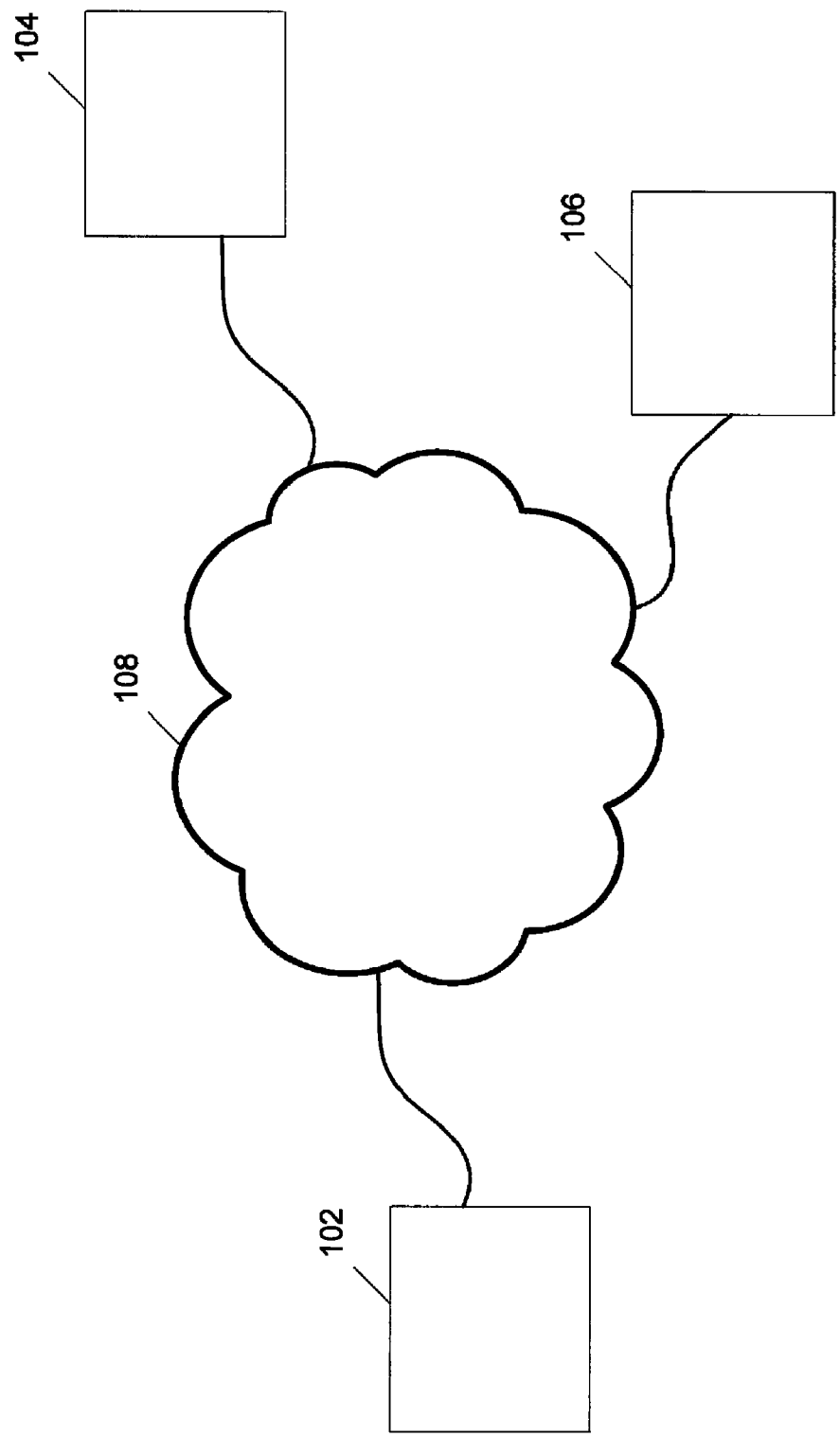
FIG. 1 is a block diagram of an example online game environment.

FIG. 1 is a block diagram of an example online game environment. As shown in FIG. 1, multiple players 102, 104, and 106 can interact and play a game over a network 108. The network 108 can be connected in many different architectures, for example, a Client Server architecture, a Peer-to-Peer network architecture, or other type of architecture. Also, the network can be different types of networks. For example, the network 108 can be the Internet, a Local Area Network or any variations of Local Area Network, a Wide Area Network, a Metropolitan Area Network, an Intranet or Extranet, or a wireless network. Also, the term "Online Gaming" or "Online Game" can be used to identify any Network topology where different players are connected to a network to send and receive information pertaining to the game.

In one embodiment, in a multi-player Online game, a player (physical person) can be replaced by another player (physical person) seamlessly without any interruption. The player who replaces the other player can inherit the online-identity (persona or character) of the other player. The replacement can appear seamless to other players in the game because there is a small or very low replacement time. In this way, the replacement does not interrupt the online game play. Replacement time includes the time it takes to switch a character or persona between two players. It is desirable for the replacement time to be on the order of milliseconds.

In one embodiment, a player who is replaced by another player may or may not be able to reclaim his online-identity in the duration of the game play. Whether a player can reclaim their online-identity can be governed by the game policy.

Online replacement of a player in an Online Game in play can be initiated or triggered in many ways. For example, in one embodiment, a player who wants to be replaced can raise a flag, or otherwise indicate their desire to be replaced. Any other player, in accordance with established rules of the game, can then replace the player, such as by taking the flag. In another embodiment, a player who wants to be replaced can send an instant message, or a voice or video message, to another online player and the other online player can replace the player if they want to. In general, a player who wants to be replaced can communicate through any available means to any person who has an online identity in the game. In still another embodiment, a moderator or team leader in the game can initiate a replacement. In other embodiments, any game specific policy can initiate or trigger a replacement.

In one embodiment, if a player wishes to leave an online game and there is not another player available to take their place, then the player can be replaced by artificial intelligence (AI) that can manipulate the online identity until a replacement player becomes available. For example, the AI could take preprogrammed actions, or it could mimic the actions, or learn from the actions of the other players. Also, AI can control the online identity during the transition from one online player to another online player. In another embodiment, a team leader, or another team member, of a team that is losing a player and there is not an adequate replacement player available can send commands to the online identity to control the identity until a replacement player is available. In addition, a game manager could send commands to the online identity until a replacement player is available.

Replacements can be generally grouped into two categories: one-way player replacement; and two-way player replacement. As described in further detail below, these two categories of player replacement can be used to produce many different types of replacements.

One-Way Online Player Replacement

In one embodiment, during an online game play using one-way player replacement techniques, a player who replaces another player inherits the online-identity (persona or character) of the player who is replaced. The replaced player leaves the game or becomes a spectator in the game.

Figure 2A:
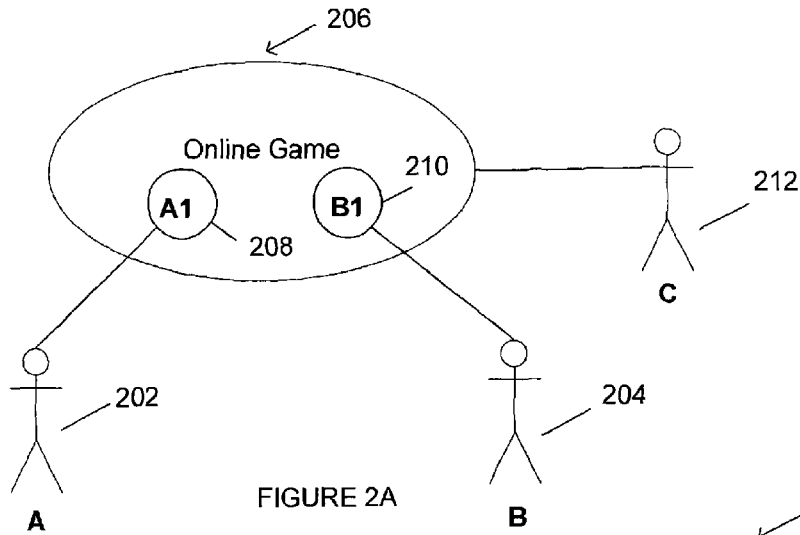
FIG. 2A is a diagram illustrating an initial online gaming environment.
Figure 2B:
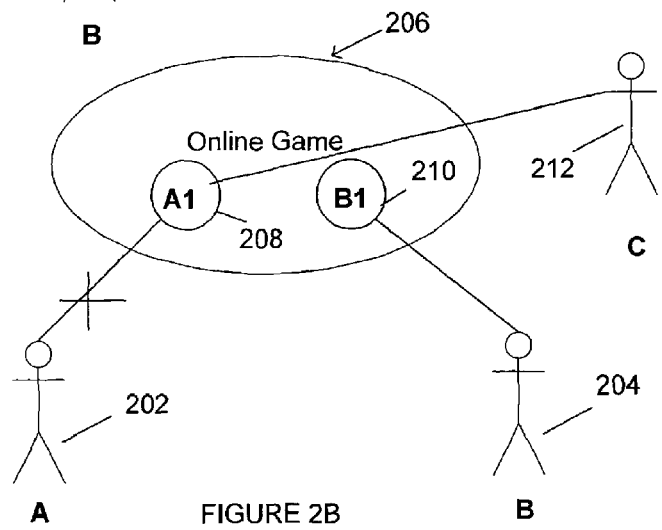
FIG. 2B is a diagram illustrating an embodiment of online player replacement.
Figure 2C:
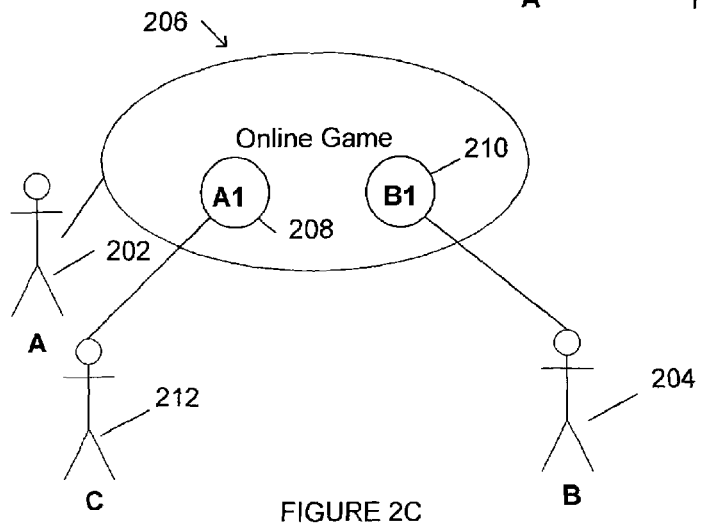
FIG. 2C is a diagram illustrating the completion of the one-way player replacement of FIG. 2B.

FIGS. 2A-C illustrate an example of a one-way player replacement technique. FIG. 2A is a diagram illustrating an initial online gaming environment. As shown in FIG. 2A, a first and second player, 202 and 204, are engaged in an online game 206. The first and second players 202 and 204 are associated with, or assume, online game identities 208 and 210 respectively. A third player 212 is a spectator of the online game 206.

FIG. 2B is a diagram illustrating an embodiment of online player replacement. In the example of FIG. 2B the spectator 212 will replace the first player 202. As noted, the replacement can be triggered by any of the above mentioned trigger methods.

FIG. 2C is a diagram illustrating the completion of the one-way player replacement of FIG. 2B. As shown in FIG. 2C, the spectator 212 has replaced the first player 202. After the replacement, the spectator 212 plays as the online identity 208 that the first player had previously had. The first player 202 can now leave the online game 206 or remain as a spectator.

It is noted that the online identities 208 and 210 in the game before the replacement and after the replacement remain the same. Also, a player from one online game in play can also replace a player from another online game in play in a one-way replacement.

Two-Way Online Player Replacement

In an embodiment, during an online game play using two-way player replacement techniques, two players interchange their online-identities. After the two players exchange their on-line identities each player inherits other player's online-identity (persona or character).

Figure 3A:
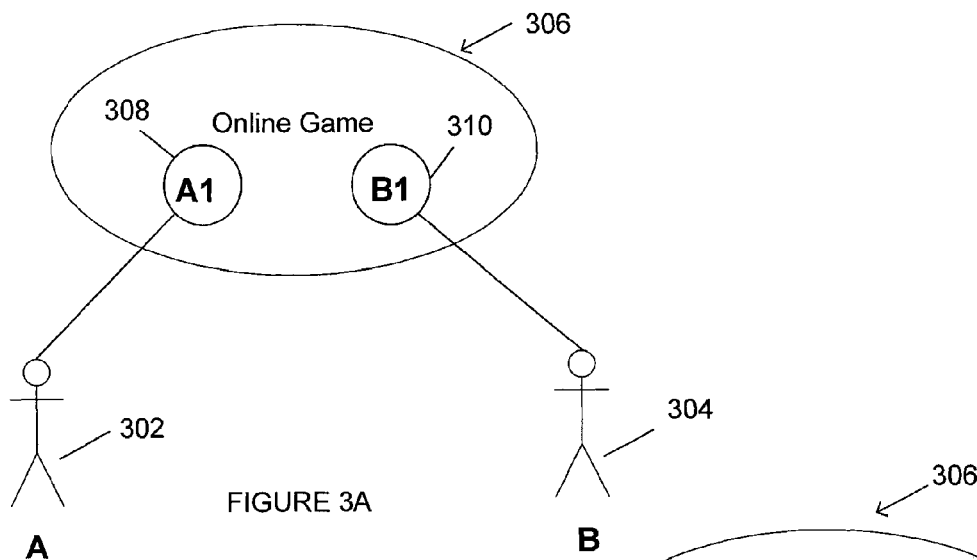
FIG. 3A is a diagram illustrating an initial online gaming environment.
Figure 3B:
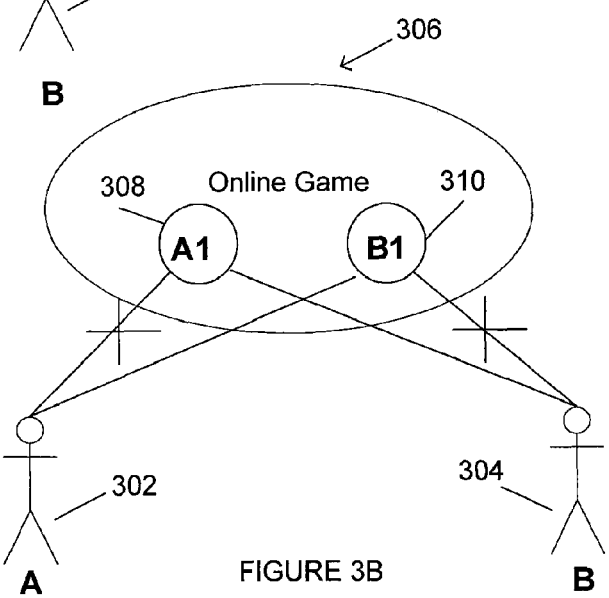
FIG. 3B is a diagram illustrating an embodiment of two-way online player replacement.
Figure 3C:
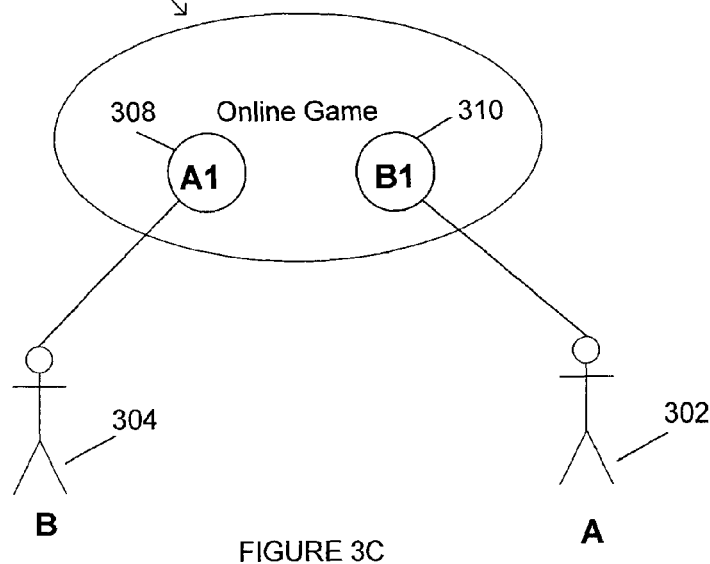
FIG. 3C is a diagram illustrating the completion of the two-way player replacement of FIG. 3B.

FIGS. 3A-C illustrate an example of a two-way player replacement technique. FIG. 3A is a diagram illustrating an initial online gaming environment. As shown in FIG. 3A, a first and second player, 302 and 304, are engaged in an online game 306. The first and second players 302 and 304 are associated with, or assume, online game identities 308 and 310 respectively.

FIG. 3B is a diagram illustrating an embodiment of two-way online player replacement. In the example of FIG. 3B the first player 302 will replace the second player 304, and the second player 304 will replace the first player 302. As noted, the replacement can be triggered by any of the above mentioned trigger methods.

FIG. 3C is a diagram illustrating the completion of the two-way player replacement of FIG. 3B. As shown in FIG. 3C, the first player 302 has assumed the online identify 310 that the second player previously had, and the second player 304 has assumed the online identity 308 that the first player previously had.

It is noted that the online identities 308 and 310 in the game before the replacement and after the replacement remain the same. In addition, two players from two different online games can also replace each other in a two-way replacement.

Variations of One-Way Online Player Replacement

Figure 4A:
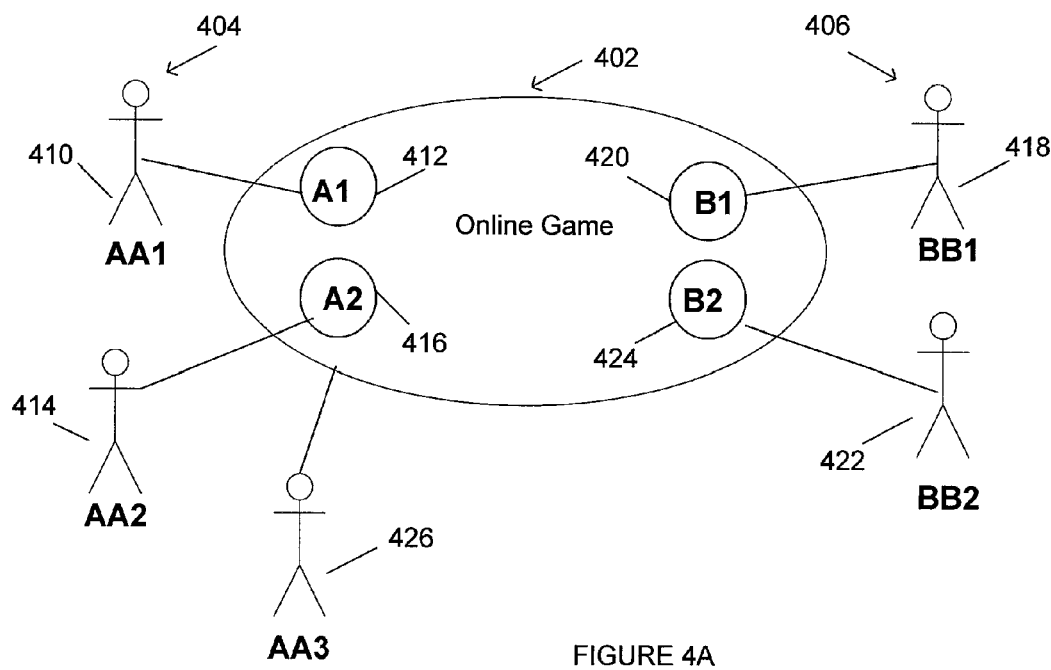
FIG. 4A is a diagram illustrating an online team game environment.

In one embodiment, one-way player replacement can be used in an online team game. FIG. 4A is a diagram illustrating an online team game environment. As shown in FIG. 4A, an online game 402 includes a first team (Team A) 404 and a second team (Team B) 406. The first team (Team A) 404 includes a first player 410 that is associated with a first online identity 412, and a second player 414 associated with a second online identity 416. The second team (Team B) 406 includes a first player 418 associated with a third online identity 420, and a second player 422 associated with a fourth online identity 424. There is also a spectator 426 that is not associated with any online identity.

Figure 4B:
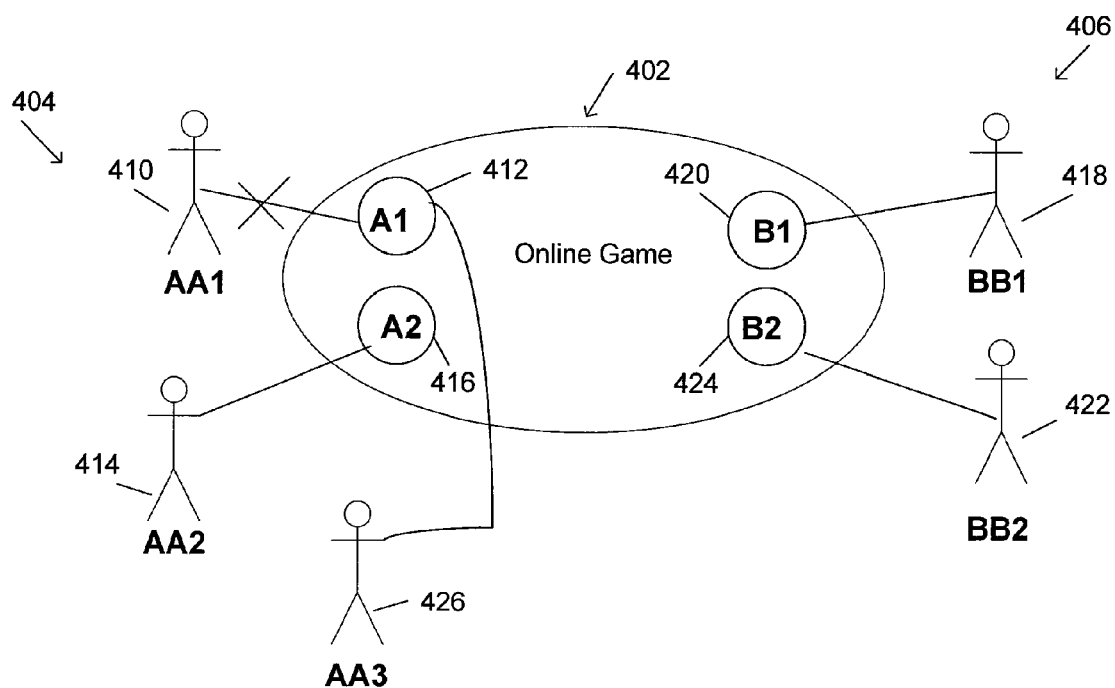
FIG. 4B is a diagram illustrating an embodiment of online player replacement.

FIG. 4B is a diagram illustrating an embodiment of online player replacement. In the example of FIG. 4B the spectator 426 will replace the first player 412 of the first team (Team A) 404. As noted, the replacement can be triggered by any of the above mentioned trigger methods.

Figure 4C:
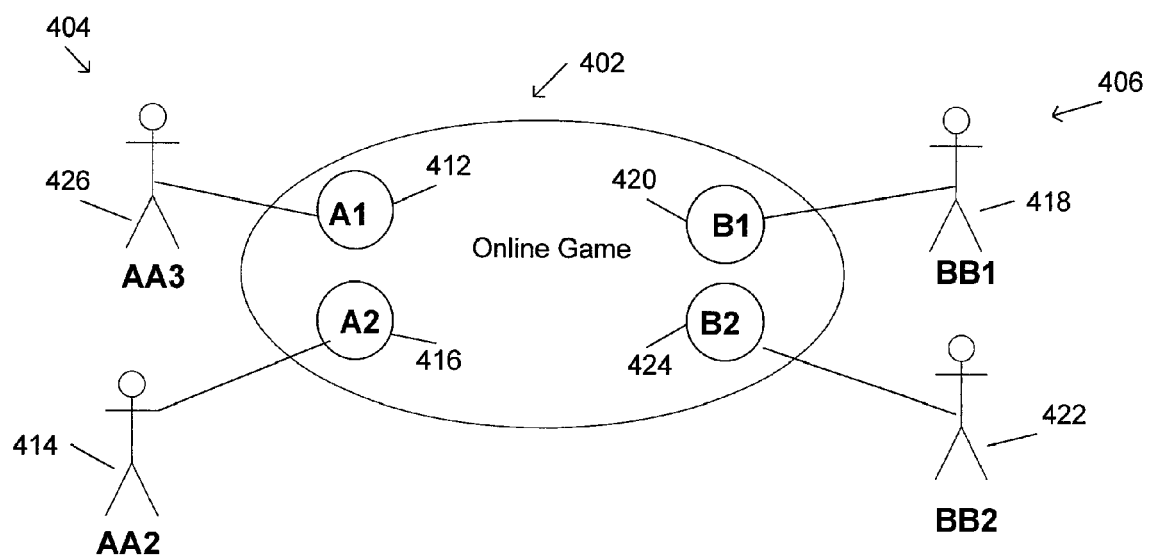
FIG. 4C is a diagram illustrating the completion of the one-way player replacement of FIG. 4B.

FIG. 4C is a diagram illustrating the completion of the one-way player replacement of FIG. 4B. As shown in FIG. 4C, the spectator 426 has replaced the first player 410 of the first team (Team A) 404. After the replacement, the spectator 426 plays as the online identity 412 that the first player previously had. Now, the spectator 426 is part of the first team (Team A) 404 and participates in the online game 402 along with their teammate, the second player 414 of the first team (Team A) 404. The first player 410 of the first team (Team A) 404 can now leave the online game 402 or remain as a spectator.

It is noted that the online identities 412, 416, 420, and 424 in the game before the replacement and after the replacement remain the same.

Variations of Two-Way Online Player Replacement

Figure 5A:
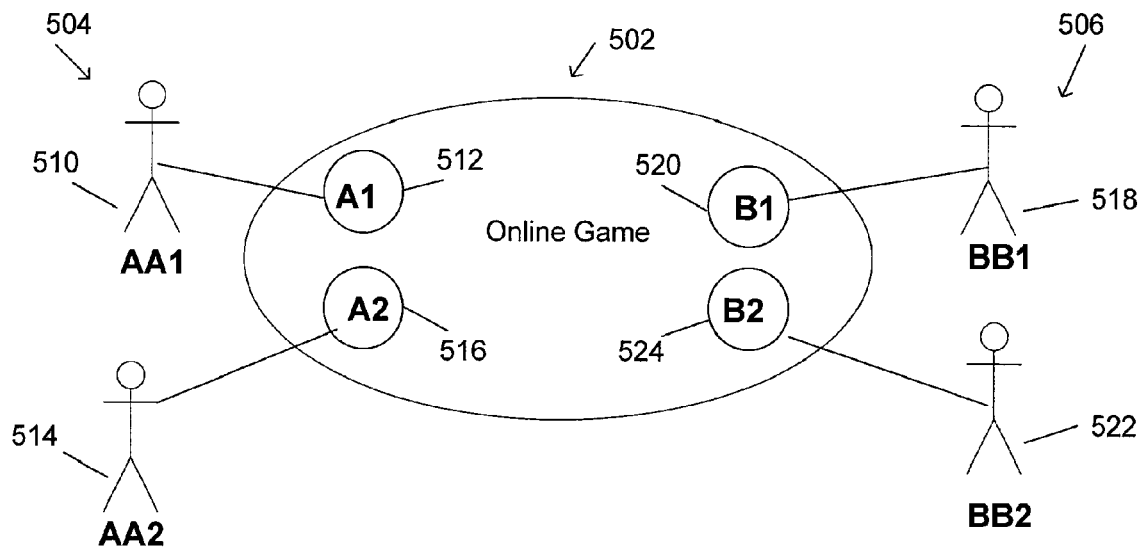
FIG. 5A is a diagram illustrating an online team game environment.

In one embodiment of a two-way online player replacement two players that are on the same team can interchange their online identities. FIG. 5A is a diagram illustrating an online team game environment. As shown in FIG. 5A, an online game 502 includes a first team (Team A) 504 and a second team (Team B) 506. The first team (Team A) 504 includes a first player 510 that is associated with a first online identity 512, and a second player 514 associated with a second online identity 516. The second team (Team B) 506 includes a first player 518 associated with a third online identity 520, and a second player 522 associated with a fourth online identity 524.

Figure 5B:
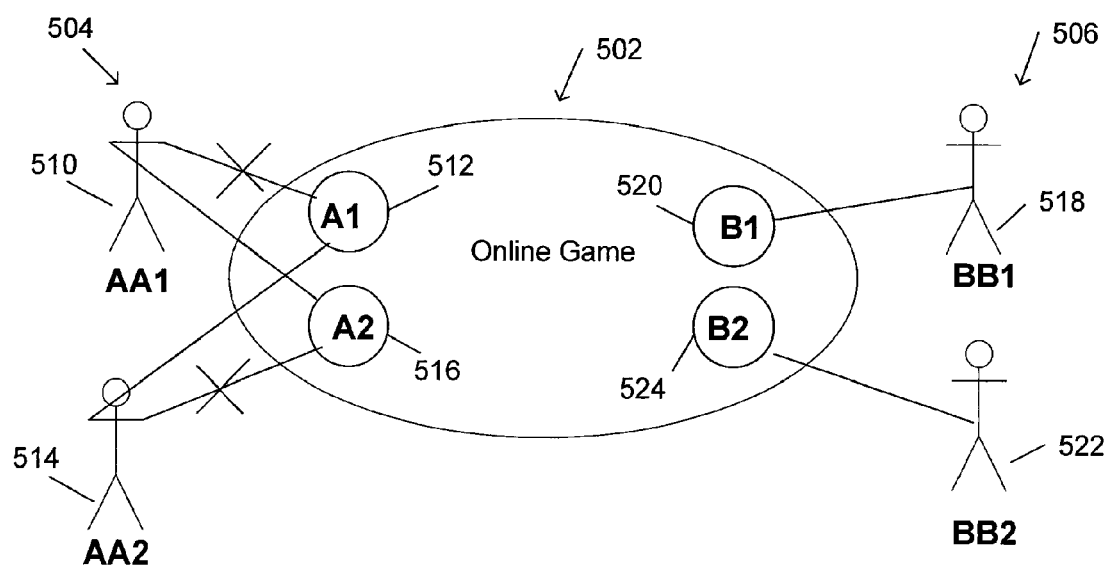
FIG. 5B is a diagram illustrating an embodiment of online player replacement within the same team.

FIG. 5B is a diagram illustrating an embodiment of online player replacement within the same team. In the example of FIG. 5B the first player 510 and the second player 514 on the first team (Team A) 504 will exchange online entities 512 and 516. In this example, the first player 510 will assume the second online identity 516 and the second player 514 will assume the first online identity 512. As noted, the replacement can be triggered by any of the above mentioned trigger methods.

Figure 5C:
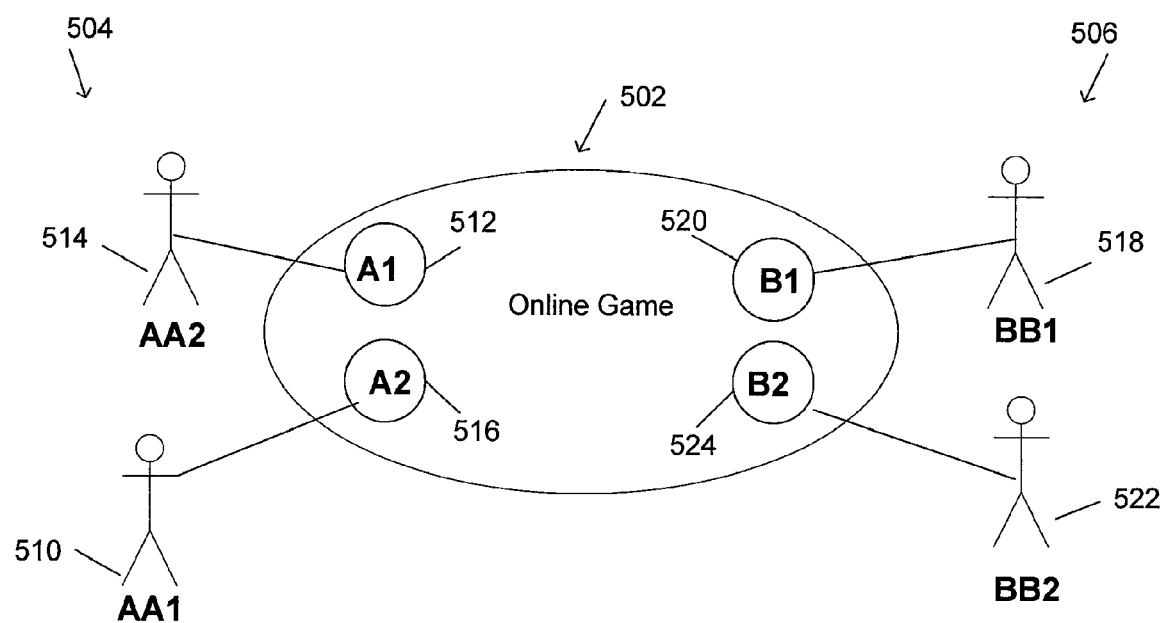
FIG. 5C is a diagram illustrating the completion of the two-way player replacement of FIG. 5B.

FIG. 5C is a diagram illustrating the completion of the two-way player replacement of FIG. 5B. As shown in FIG. 5C, the first player 510 on the first team (Team A) 504 has assumed the second online identity 516 that used to be associated with the second player 514 on the first team (Team A) 504. Likewise, the second player 514 of the first team (Team A) 504 has assumed the first online identity 512 that used to be associated with the first player 510 on the first team (Team A) 504.

Figure 6A:
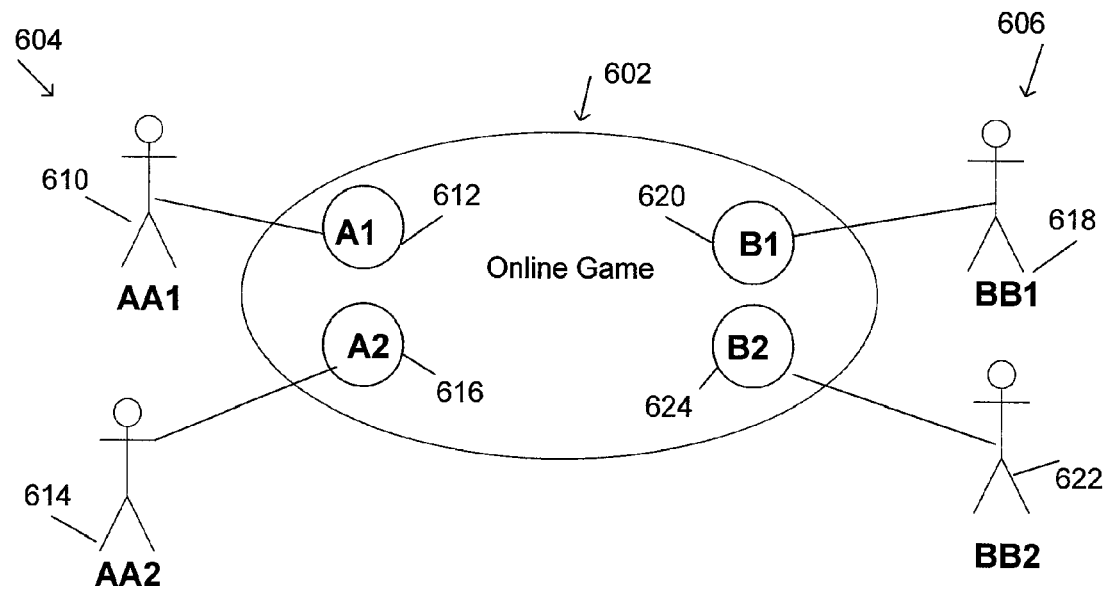
FIG. 6A is a diagram illustrating an online team game environment.

In another embodiment of a two-way online player replacement two players that are on different teams can interchange their online identities. FIG. 6A is a diagram illustrating an online team game environment. As shown in FIG. 6A, an online game 602 includes a first team (Team A) 604 and a second team (Team B) 606. The first team (Team A) 604 includes a first player 610 that is associated with a first online identity 612, and a second player 614 associated with a second online identity 616. The second team (Team B) 606 includes a first player 618 associated with a third online identity 620, and a second player 622 associated with a fourth online identity 624.

Figure 6B:
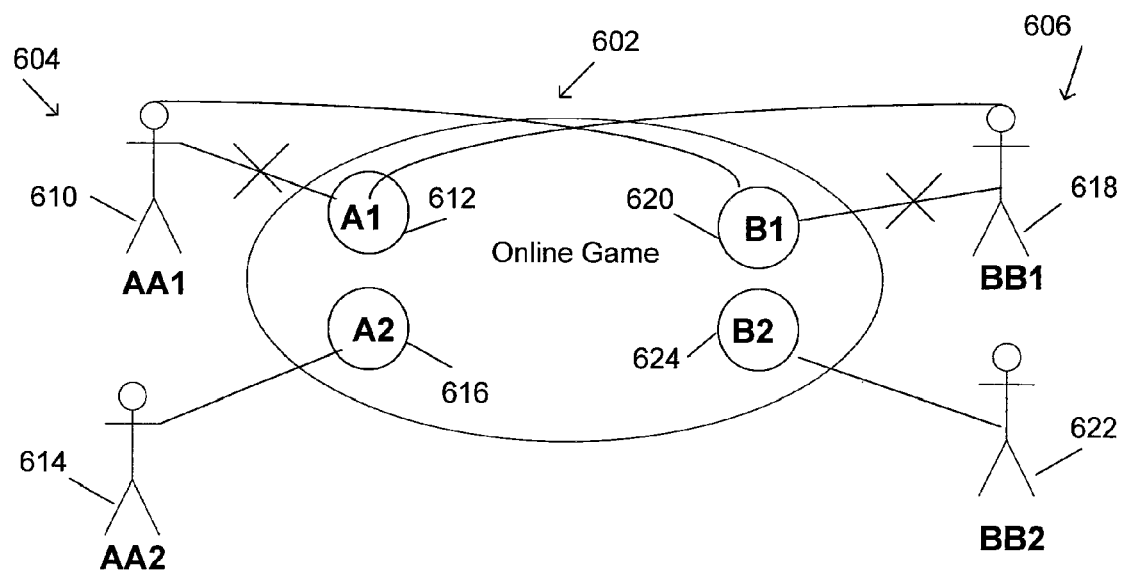
FIG. 6B is a diagram illustrating an embodiment of replacement of online players on different teams.

FIG. 6B is a diagram illustrating an embodiment of replacement of online players on different teams. In the example of FIG. 6B the first player 610 on the first team (Team A) 604 and the first player 618 on the second team (Team B) 606 will exchange their online identities 612 and 620. In this example, the first player 610 on the first team (Team A) 604 will assume the third online identity 620 and the first player 618 on the second team (Team B) 606 will assume the first online identity 612. As noted, the replacement can be triggered by any of the above mentioned trigger methods.

Figure 6C:
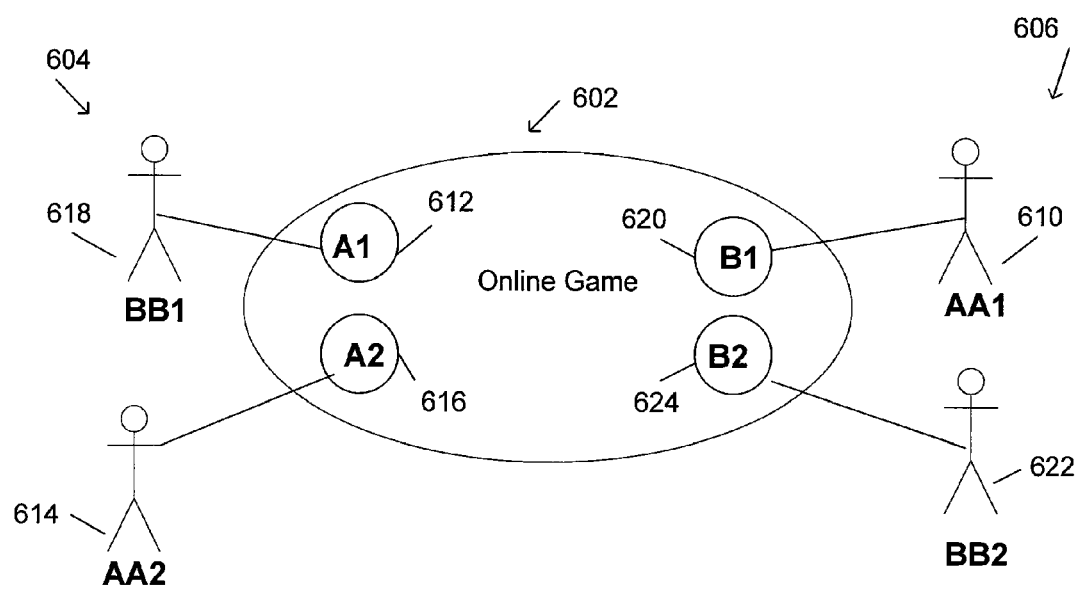
FIG. 6C is a diagram illustrating the completion of the two-way player replacement on different teams of FIG. 6B.

FIG. 6C is a diagram illustrating the completion of the two-way player replacement on different teams of FIG. 6B. As shown in FIG. 6C, the first player 610 on the first team (Team A) 604 has assumed the third online identity 620 that used to be associated with the first player 618 on the second team (Team B) 606. Likewise, the first player 618 of the second team (Team B) 606 has assumed the first online identity 612 that used to be associated with the first player 610 on the first team (Team A) 604.

Variations that Include Both One-Way and Two-Way Online Player Replacement

In one embodiment, both one-way and two way replacement types can occur in an online game. For example, in an online game a character (online identity) in the online game can be a channel (or a group) and players, or users, registered with the channel (or the group) can assume the identity and play the game. Various rules or policies can be used to determine which player gets to assume the identity and play game. Examples of rules or policies that can be used include:

1) first come first serve;
 2) fixed time slots;
 3) random selection of users;
 4) decided by the moderator; and
 5) any game based policy.

Figure 7:
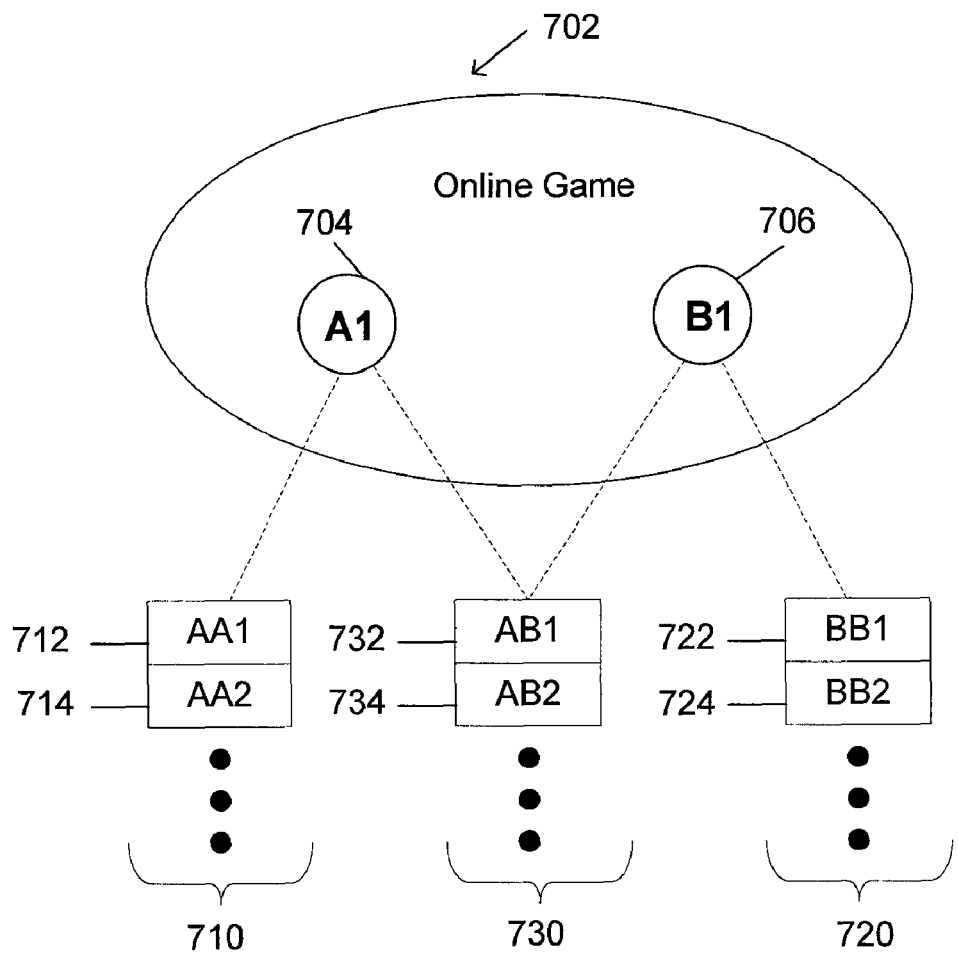
FIG. 7 is a diagram illustrating an online team game environment.

FIG. 7 is a diagram illustrating an online team game environment. As shown in FIG. 7, an online game 702 that includes two online identities (A1) 704 and (B1) 706. Each of the online identities (A1) 704 and (B1) 706 have a channel of registered users, or players. For example, the first online identity (A1) 704 has a channel of registered players 710. In the example illustrated in FIG. 7, the channel of registered players 710 that are registered with the first online identity (A1) 704 includes two registered players (AA1) 712 and (AA2) 714. Also, the channel of registered players 720 that are registered with the second online identity (B1) 706 includes two registered players (BB1) 722 and (BB2) 724. There is another group of registered players 730 that are registered to play either of the online identities (A1) 704 and (B1) 706. The group of registered players 730 that are registered to play either of the online identities (A1) 704 and (B1) 704 include two registered players (AB1) 732 and (AB2) 734. While the example of FIG. 7 shows two players in each of the groups 710, 720, and 730 any number of players may be in the groups. Also the number of players in each group do not need to be the same.

In the example of FIG. 7, players in groups 710 and 730 can play the online game 702 as the first online identity (A1) 704. Also, players in groups 720 and 730 can play the online game 702 as the second online identity (B1) 706.

Various combinations of one-way and two-way replacements are possible among the players. For example, the group of players 720 that are registered to play as the first online identity (A1) 704 can replace each other as the first identity (A1) 704 in a one-way replacement. In one example, if a first player (AA1) 712 is playing as the first online identity (A1) 704, they can be replaced by a second player (AA2) in a one-way replacement. Likewise, the group of players 720 that are registered to play as the second online identity (B1) 706 can replace each other as the second identity (B1) 706 in a one-way replacement. In one example, if a first player (BB1) 722 is playing as the second online identity (B1) 706, they can be replaced by a second player (BB2) in a one-way replacement. The replacements can take place when a replacement is trigger by game rules or policies.

In one embodiment, the group of players 730 that are registered to play as either the first online identity (A1) 704 or the second online identity (B1) 706 can replace each other as well as the players 720 registered to play the first online identity (A1) 704 and the group of players 730 registered to play the second online identity (B1) 706 in a one-way replacement. For example, players (AB1) 732 or (AB2) 734 can replace a player as the first online identity (A1) 704 or the second online identity (B1) 706. Also, if a player (AB1) 732 from the group of players 730 that are registered with both online identities (A1) 704 and (B1) 706 is playing as the first online identity (A1) 704, they can be replaced by another player (AB2) 734 from that group. Replacement of the second online identity (B1) 706 is similar.

In another embodiment the group of players 730 that are registered to play as either the first online identity (A1) 704 or the second online identity (B1) 706 can replace each other as the first online identity (A1) 704 or the second online identity (B1) 706 in a two-way replacement. For example, a first player of the group (AB1) 732 can be playing as the first online identity (A1) 704 and a second player of the group (AB2) 734 can be playing as the second online identity (B1) 706. Because the two players (AB1) 732 and (AB2) 734 are registered to play both online identities (A1) 704 and (B1) 706, both can interchange their identities in a two-way replacement. After the replacement, the first player (AB1) 732 will play as second online identity (B1) 706 and the second player (AB2) 734 will play as the first online identity (A1) 704 in a two-way replacement.

Types of Transitions During Player Replacement

As noted, a transition from one player to another can take several forms. In one embodiment, a non-informative transition can occur. In a non-informative transitions one player will quickly replace another player in an online game without the need for prior knowledge of the current state of the game. For example, a replacement player may have been a spectator of the current game instance, or a player who is in the same game instance. In these examples, the replacement player can replace another player without the need of prior knowledge of the current state of the game.

In another embodiment, an informative transition can occur. In an informed transition, the replacement player can be presented with information on the current state of an online game instance prior to replacing another game player. For example, the replacement player can be presented with a short audio/video clip of the other player's last game play sequence. Or there could be text or audio messages between the player being replaced and the replacement player so that the player being replaced can provide information to the replacement player about the game situation. In this way, a player who is outside the current game instance will benefit from an informative transition.

Online player replacement provides many advantages. In one embodiment, in a highly competitive team game, another player can replace a player not performing well. In another embodiment, if a player does not want to cause any interruption in momentum of the game, while leaving the game, the player can let another player continue the online game. In still another embodiment, a "Good" Player can replace a "Bad" Player and continue the "Bad" player's game and help improve the "Bad" player's game. In yet another embodiment, if a player is playing a very busy online game where staying focused is tasking, a player can give themselves a break by being replaced.

The ability to replace a player "on the go" can enhance the quality of online game play. It also can improve a sense of competition, community, co-operation and sharing among game players. Also, replacement can lower the predictability in a game which can increase interest among game players.

Replacement of players can be managed by a server in a server client network, or by a peer in a peer-to-peer network. For example, the server, or a peer, can maintain a map of player address and online identities. The map can associate the current players with their respective online identities as well as maintain a list of which online identities players are registered to be.

Figure 8A:
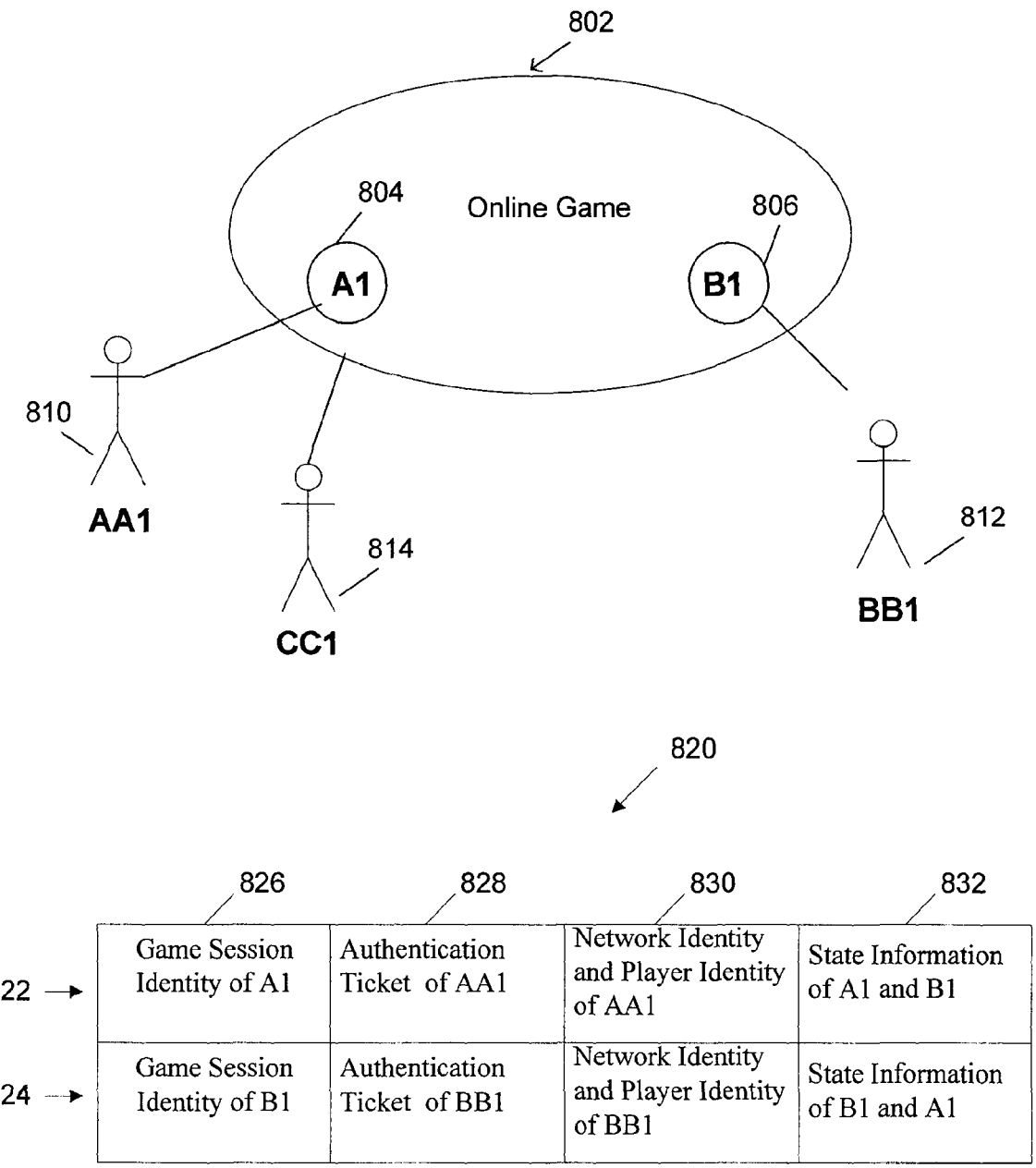
FIG. 8A is a block diagram of an example embodiment of a player/online identity map.

FIG. 8A is a block diagram of an example embodiment of a player/online identity map. As shown in FIG. 8A, an online game 802 includes two online identities (A1) 804 and (B1) 806. A first player (AA1) 810 is playing as the first online identity (A1) 804 and a second player (BB1) 812 is playing as the second online identity (B1) 806. A third player (CC1) 814 is a spectator. A map 820 associates online identities in a game with their respective players and state information of the players. For example, the map 820 can associate the game session 822 of the first online identity (A1) 804 with the first player (AA1) 810 and the game session 824 of the second online identity (B1) 806 with the second player (BB1) 812.

In the example of FIG. 8A, the map 820 of the first game session 822 for the first online identity (A1) 804 includes entries for game session identity 826, an authentication ticket of the associated player 828, network identity and player identity of the associated player 830, and state information 832 of the first and second online identities (A1) 804 and (B1) 806. The map 820 of the second game session 824 includes corresponding entries for the second online identity (B1) 806. In other embodiments the map 820 can include other entries and information about the game session.

Figure 8B:
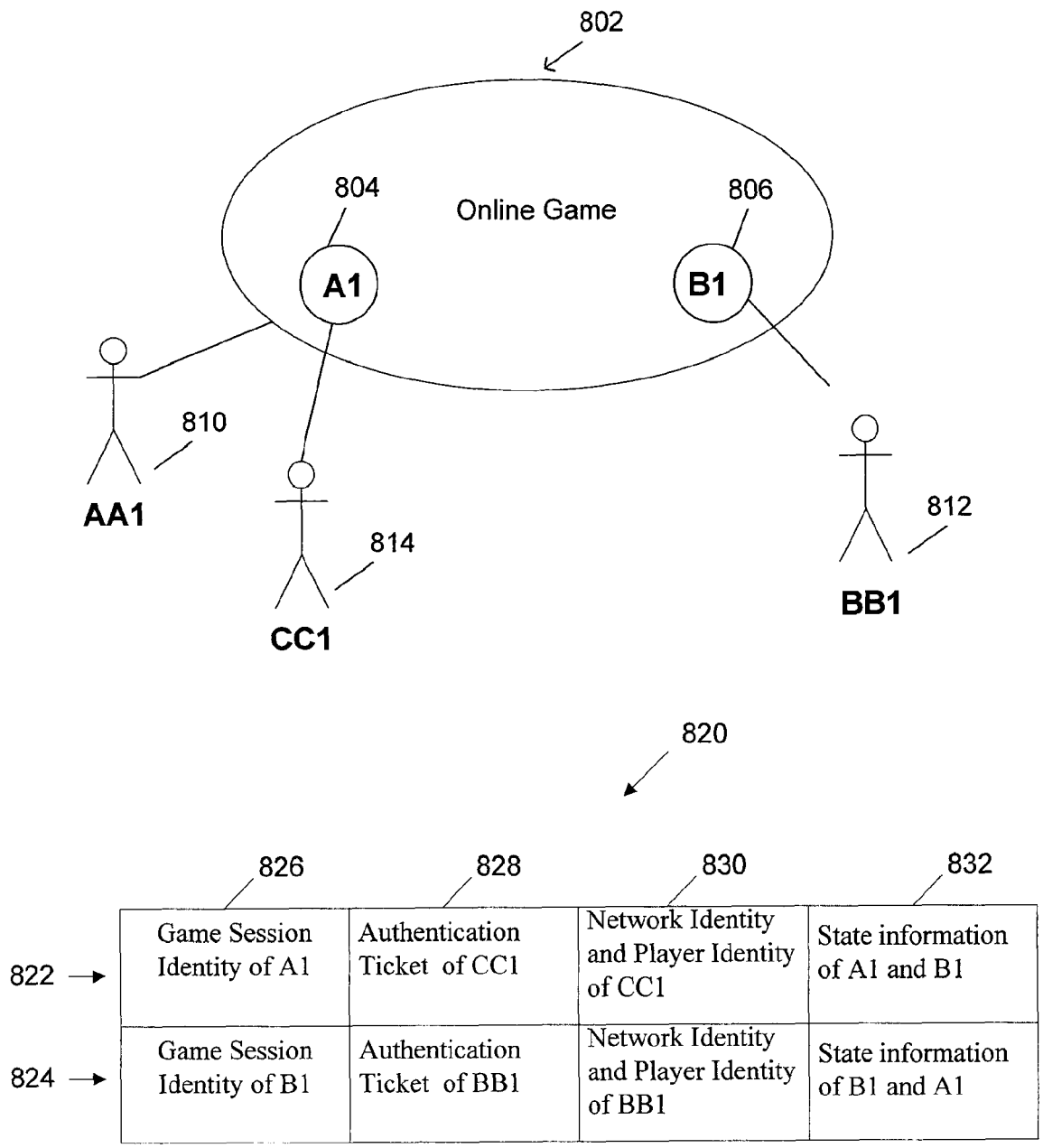
FIG. 8B is a block diagram illustrating a one-way replacement of the online game of FIG. 8A.

FIG. 8B is a block diagram illustrating a one-way replacement of the online game of FIG. 8A. As shown in FIG. 8B, after the replacement, the spectator (CC1) 814 has replaced the first player (AA1) 810 and assumed the first online identity (A1) 804. To accomplish the replacement, the map 820 was updated to associate the game session of first online identity (A1) 804 with the third player (CC1) 814. The first player (AA1) 810 can remain as a spectator of the game or leave the game.

Figure 8C:
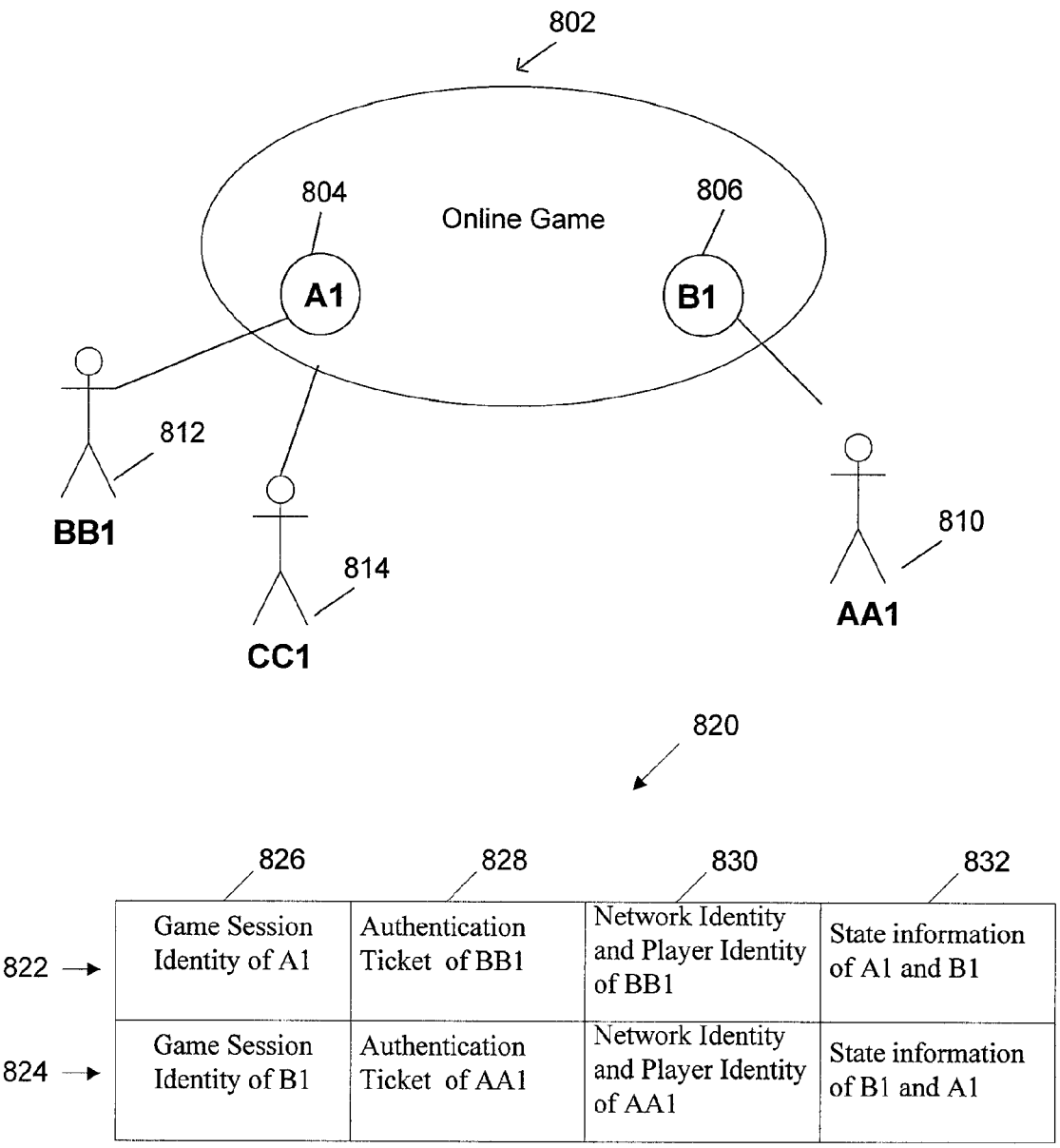
FIG. 8C is a block diagram illustrating a two-way replacement of the online game of FIG. 8A.

FIG. 8C is a block diagram illustrating a two-way replacement of the online game of FIG. 8A. As shown in FIG. 8C, after the replacement, the first and second players (AA1) 810 and (BB1) 812 have changed their online identities. In FIG. 8C, the first player (AA1) 810 has assumed the second online identity (B1) 806 and the second player (BB1) 812 has assumed the first online identity (A1) 804. To accomplish the replacement, the map 820 was updated to associate the game session of second online identity (B1) 806 with the first player (AA1) 810, and the game session of first online identity (A1) 804 with the second player (BB1) 812.

In another embodiment, a player can log onto a game and be authenticated. For example, after being authenticated, the player may receive a "ticket" identifying the player as being authenticated and associating the player with an online identity. Then, when a player wishes to be replaced, the player can passes their "ticket" to their replacement.

Figure 9:
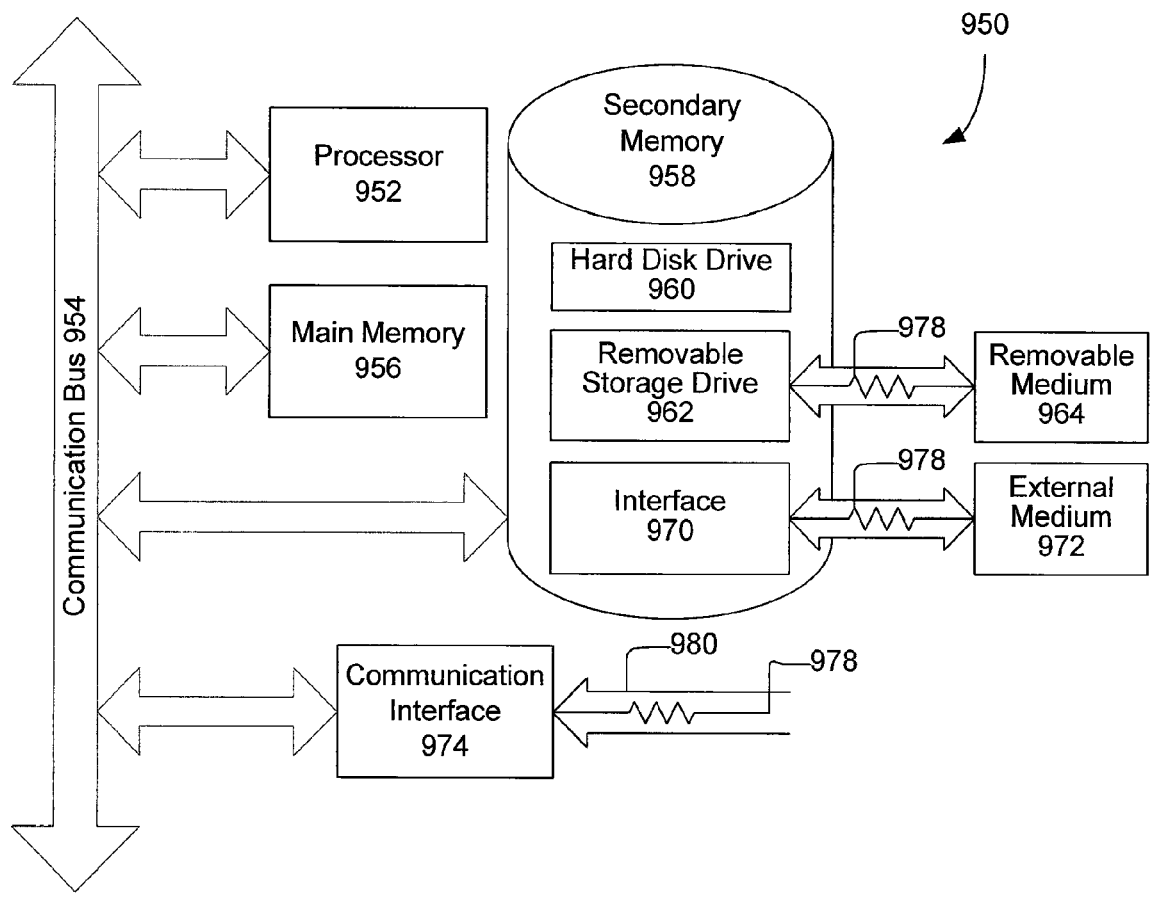
FIG. 9 is a block diagram illustrating an example network enabled device that may be used in connection with various embodiments described herein.

FIG. 9 is a block diagram illustrating an example network enabled device 950 that may be used in connection with various embodiments described herein. Other network enabled devices, such as other computers or game consoles and/or architectures may be used, as will be clear to those skilled in the art.

The network enabled device 950 preferably includes one or more processors, such as processor 952. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor, for example if parallel processing is to be implemented. Such auxiliary processors or coprocessors may be discrete processors or may be integrated with the processor 1352.

The processor 952 is preferably connected to a communication bus 954. The communication bus 954 may include a data channel for facilitating information transfer between storage and other peripheral components of the computer system 950. The communication bus 954 further may provide a set of signals used for communication with the processor 952, including a data bus, address bus, and control bus (not shown). The communication bus 954 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

The network enabled device 950 preferably includes a main memory 956 and may also include a secondary memory 958. The main memory 956 provides storage of instructions and data for programs executing on the processor 952. The main memory 956 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 958 may optionally include a hard disk drive 960 and/or a removable storage drive 962, for example a floppy disk drive, a magnetic tape drive, a compact disc ("CD") drive, a digital versatile disc ("DVD") drive, a memory stick, etc. The removable storage drive 962 reads from and/or writes to a removable storage medium 964 in a well-known manner. Removable storage medium 964 may be, for example, a CD, DVD, a flash drive, a memory stick, etc.

The removable storage medium 964 is preferably a computer readable medium having stored thereon computer executable code (i.e., software) and/or data. The computer software or data stored on the removable storage medium 964 is read into the computer system 950 as electrical communication signals 978.

In alternative embodiments, secondary memory 958 may include other similar means for allowing computer programs or other data or instructions to be loaded into the computer system 950. Such means may include, for example, an external storage medium 972 and an interface 970. Examples of external storage medium 972 may include an external hard disk drive or an external optical drive, or and external magneto-optical drive.

Other examples of secondary memory 958 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 972 and interfaces 970, which allow software and data to be transferred from the removable storage unit 972 to the network enabled device 950.

The network enabled device 950 may also include a communication interface 974. The communication interface 974 allows software and data to be transferred between the network enabled device 950 and external devices, networks, or information sources. For example, computer software or executable code may be transferred to network enabled device 950 from a network server via communication interface 974. In addition, the communication interface 974 can establish and maintain communications, both wired and wireless, to external networks, such as the Internet. Examples of communication interface 974 include a modem, a network interface card ("NIC"), a communications port, a PCMCIA slot and card, an infrared interface, and an IEEE 1394 firewire, a wireless LAN, an IEEE 802.11 interface, an IEEE 802.16 interface, a Blue Tooth interface, a mesh network interface, just to name a few.

Communication interface 974 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via the communication interface 974 are generally in the form of electrical communication signals 978. These signals 978 are preferably provided to communication interface 974 via a communication channel 980. The communication channel 980 carries the signals 978 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) can be stored in the main memory 956 and/or the secondary memory 958. Computer programs can also be received via the communication interface 974 and stored in the main memory 956 and/or the secondary memory 958. Such computer programs, when executed, enable the computer system 950 to perform the various functions of the present invention as previously described.

In this description, the term "computer readable medium" is used to refer to any media used to store data and/or provide computer executable code (e.g., software and computer programs) to the network enabled device 9050. Examples of these media include main memory 956, secondary memory 958 (including hard disk drive 960, removable storage medium 964, and external storage medium 972), and any peripheral device communicatively coupled with communication interface 974 (including a network information server or other network device). These computer readable mediums are means for providing executable code, programming instructions, and software, or storing and/or recording data to the network enabled device 950.

In an embodiment that is implemented using software, the software may be stored on a computer readable medium and loaded into the network enabled device 950 by way of removable storage drive 962, interface 970, or communication interface 974. In such an embodiment, the software is loaded into the network enabled device 950 in the form of electrical communication signals 978. The software, when executed by the processor 952, preferably causes the processor 952 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

The term "module" as used herein means, but is not limited to a software or hardware component, such as an FPGA or an ASIC, which performs certain tasks. A module may advantageously be configured to reside on an addressable storage medium and configured to execute on one or more network enabled devices or processors. Thus, a module may include, by way of example, components, processes, functions, attributes, procedures, subroutines, segments of program code, drivers, firmware, microcode, circuitry, data, databases, data structures, tables, arrays, variables, and the like. The functionality provided for in the components and modules may be combined into fewer components and modules or further separated into additional components and modules. Additionally, the components and modules may advantageously be implemented to execute on one or more network enabled devices or computers.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. Thus, the invention is not intended to be limited to the embodiment shown herein but is to be accorded the widest scope consistent with the principal and novel features disclosed herein.

What is claimed is:

1. A non-transitory storage medium storing a computer program comprising executable instructions that cause a computer to:
   associate a first player with a first online identity which represents an object, persona or character under control of the first player;
   associate a second player with a second online identity which represents an object, persona or character under control of the second player;
   communicate a message from the first player to a plurality of players that the first player wishes to be replaced by a third player who will assume control of the object, persona or character represented by the first online identity;
   receive a return message from the third player that the third player is willing to replace the first player;
   replace the first player with the third player by associating the third player with the first online identity and disassociating the first player with the first online identity, such that the third player assumes control of the object, persona or character that was under control of the first player,
   wherein the executable instructions that cause the computer to replace the first player is completed during a replacement time that is a substantially short period of time so as to not interrupt game play such that the replacement appears seamless to other players in an online game; and
   provide game situation information to the third player before the third player is associated with the first online identity.

2. The non-transitory storage medium of claim 1, wherein the executable instructions that cause the computer to replace the first player is initiated in accordance with game rules.

3. The non-transitory storage medium of claim 1, wherein the third player is provided information about a current game situation after the replacement.

4. The non-transitory storage medium of claim 3, wherein the information comprises a clip of recent game play, the clip comprising video information.

5. The non-transitory storage medium of claim 3, wherein the information comprises messages sent by the first player to the second player.

6. The non-transitory storage medium of claim 1, wherein the executable instructions that cause the computer to replace the first player comprises executable instructions that cause the computer to associate the first online identity with artificial intelligence so that the artificial intelligence controls the first online identity.

7. The non-transitory storage medium of claim 1, wherein the executable instructions that cause the computer to replace the first player is initiated by a moderator in the online game.

8. The non-transitory storage medium of claim 1, wherein the executable instructions that cause the computer to replace the first player is initiated by a leader of a team of which the first online identity is a member.

9. The non-transitory storage medium of claim 1, wherein the third player is registered with the first online identity.

* * * * *